(12) United States Patent
Yi et al.

(10) Patent No.: US 10,416,886 B2
(45) Date of Patent: Sep. 17, 2019

(54) DATA STORAGE DEVICE THAT REASSIGNS COMMANDS ASSIGNED TO SCALE-OUT STORAGE DEVICES AND DATA PROCESSING SYSTEM HAVING THE SAME

(71) Applicant: SAMSUNG ELECTRONICS CO., LTD., Suwon-si, Gyeonggi-Do (KR)

(72) Inventors: Hyun Ju Yi, Hwaseong-si (KR); Seok Won Ahn, Suwon-si (KR); Jun Ho Choi, Seoul (KR); Chan Ho Yoon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/090,702

(22) Filed: Apr. 5, 2016

(65) Prior Publication Data
US 2016/0291873 A1 Oct. 6, 2016

(30) Foreign Application Priority Data
Apr. 6, 2015 (KR) .......................... 10-2015-0048263

(51) Int. Cl.
*G06F 3/06* (2006.01)
*G06F 12/02* (2006.01)
*G06F 9/50* (2006.01)
*H04L 29/08* (2006.01)

(52) U.S. Cl.
CPC .......... *G06F 3/0604* (2013.01); *G06F 3/0629* (2013.01); *G06F 3/0685* (2013.01); *G06F 9/5083* (2013.01); *G06F 12/0246* (2013.01); *H04L 67/1002* (2013.01); *G06F 2212/1016* (2013.01); *G06F 2212/7201* (2013.01); *G06F 2212/7203* (2013.01); *G06F 2212/7205* (2013.01); *G06F 2212/7208* (2013.01)

(58) Field of Classification Search
CPC .. G06F 3/0604; G06F 9/5083; G06F 12/0246; G06F 3/0685; G06F 3/0629; G06F 2212/7201; G06F 2212/7203; G06F 2212/7205; G06F 2212/7208; G06F 2212/1016; H04L 67/1002
USPC ................................................. 711/103, 115
See application file for complete search history.

(56) References Cited

U.S. PATENT DOCUMENTS

| 7,743,203 B2 | 6/2010 | France |
| 7,773,413 B2 | 8/2010 | Shalvi |
| 7,796,424 B2 | 9/2010 | Happ et al. |
| 7,957,189 B2 | 6/2011 | Avraham et al. |
| 8,185,713 B2 | 5/2012 | Shin et al. |

(Continued)

FOREIGN PATENT DOCUMENTS

KR 1366960 2/2014

*Primary Examiner* — Tasnima Matin
(74) *Attorney, Agent, or Firm* — Volentine, Whitt & Francos, PLLC

(57) ABSTRACT

The data storage device includes scale-out storage devices and a controller configured to assign commands to the scale-out storage devices and re-assign the commands assigned to the scale-out storage devices based on state information output from a first scale-out storage device among the scale-out storage devices. Each of the scale-out storage devices includes a volatile memory device, a non-volatile memory device, and a scale-out controller configured to control the volatile memory device and the non-volatile memory device.

20 Claims, 14 Drawing Sheets

(56) References Cited

U.S. PATENT DOCUMENTS

| | | | |
|---|---|---|---|
| 8,213,255 B2 | 7/2012 | Hemink et al. | |
| 8,238,185 B2* | 8/2012 | Lee | G11C 5/143 |
| | | | 365/189.09 |
| 8,363,478 B1 | 1/2013 | Yang et al. | |
| 8,472,274 B2 | 6/2013 | Fai et al. | |
| 8,495,332 B2 | 7/2013 | Wakrat et al. | |
| 8,542,537 B2 | 9/2013 | Parker | |
| 8,560,764 B2 | 10/2013 | Huffman et al. | |
| 8,576,651 B2 | 11/2013 | Scheuerlein et al. | |
| 8,601,200 B2 | 12/2013 | Joo et al. | |
| 8,621,140 B2 | 12/2013 | Lee et al. | |
| 8,788,781 B2 | 7/2014 | Lee et al. | |
| 2004/0148482 A1* | 7/2004 | Grundy | G06F 12/06 |
| | | | 711/167 |
| 2008/0133687 A1* | 6/2008 | Fok | G06F 9/5027 |
| | | | 709/207 |
| 2008/0276242 A1* | 11/2008 | Taniguchi | G06F 9/5038 |
| | | | 718/103 |
| 2009/0228637 A1* | 9/2009 | Moon | G06F 11/1068 |
| | | | 711/103 |
| 2009/0265506 A1* | 10/2009 | Yim | G06F 3/0605 |
| | | | 711/103 |
| 2010/0074014 A1 | 3/2010 | Dunga et al. | |
| 2010/0268872 A1* | 10/2010 | Lee | G06F 13/385 |
| | | | 711/103 |
| 2012/0054423 A1 | 3/2012 | Wang et al. | |
| 2012/0102259 A1 | 4/2012 | Goss et al. | |
| 2012/0163092 A1 | 6/2012 | Jung et al. | |
| 2013/0003474 A1* | 1/2013 | Abdulla | G11C 7/1051 |
| | | | 365/191 |
| 2013/0054871 A1 | 2/2013 | Lassa | |
| 2013/0198439 A1* | 8/2013 | Kurotsuchi | G06F 12/0246 |
| | | | 711/103 |
| 2014/0075102 A1 | 3/2014 | Oh et al. | |
| 2014/0108341 A1 | 4/2014 | Marsden | |
| 2014/0137135 A1 | 5/2014 | Lee | |
| 2014/0156911 A1 | 6/2014 | Alcantara et al. | |
| 2015/0039935 A1* | 2/2015 | Gao | G06F 11/108 |
| | | | 714/6.24 |
| 2016/0216899 A1* | 7/2016 | Park | G06F 3/0616 |
| 2016/0291873 A1* | 10/2016 | Yi | G06F 3/0604 |

* cited by examiner

DATA STORAGE DEVICE THAT REASSIGNS COMMANDS ASSIGNED TO SCALE-OUT STORAGE DEVICES AND DATA PROCESSING SYSTEM HAVING THE SAME

CROSS-REFERENCE TO RELATED APPLICATION

This application claims priority under 35 U.S.C. § 119 from Korean Patent Application No. 10-2015-0048263 filed on Apr. 6, 2015 the disclosure of which is hereby incorporated by reference in its entirety.

FIELD

Embodiments of the present inventive concept relate to a data storage device, and more particularly to a data storage device which can re-assign commands assigned to scale-out storage devices based on state information output from at least one of the scale-out storage devices and a data processing system having the same.

BACKGROUND

In a case of a NAND flash memory device which includes a flash translation layer (FTL), the NAND flash memory device may need to ensure that write data output from a host are completely programmed in the NAND flash memory device.

When programming data in the NAND flash memory device, and when a block of a memory cell array to be programmed is a bad block, a program failure occurs. The NAND flash memory device needs to perform a garbage collection on the bad block so as to process the program failure, which results in the program time for program completion being prolonged. Accordingly, while the garbage collection is performed, the NAND flash memory device is in a long busy state.

Regarding data read operations, as manufacturing NAND memory cells included in a NAND flash memory device is refined, an uncorrectable error is increased in data output from the NAND memory cells, and a host uses various methods to correct the error. Accordingly, read latency of the host may be increased.

A method of increasing a data processing capability of a data storage device, e.g., a data server, includes a scale up and a scale out. The scale up improves the data processing capability of the data server by increasing a capacity of the data server itself, and is also referred to as vertical scaling. The scale out improves a data processing capability of a system including the data server by increasing the number of connected data servers, and is also referred to as horizontal scaling.

In a data storage device having a scale up structure, when the number of non-volatile memory devices included in the data storage device is increased, loading capacitance of an interface embodied between a controller controlling the non-volatile memory devices and the non-volatile memory devices is increased. Accordingly, a data processing speed of the data storage device may be decreased.

SUMMARY

Some exemplary embodiments of the present inventive concept are directed to a data storage device, including scale-out storage devices, and a controller configured to assign commands to the scale-out storage devices, and re-assign the commands which are assigned to the scale-out storage devices based on state information output from a first scale-out storage device among the scale-out storage devices, and each of the scale-out storage devices includes a volatile memory device, a non-volatile memory device, and a scale-out controller configured to control the volatile memory device and the non-volatile memory device.

The volatile memory device may include a mapping table for a logical address to physical address conversion of the non-volatile memory device, and the scale-out controller may include a central processing unit (CPU) configured to perform a flash translation layer (FTL) code for performing the logical address to physical address conversion using the mapping table.

According to some embodiments, the controller is configured to change an order of the commands assigned to the scale-out storage devices based on the state information.

According to some embodiments, the controller is configured to re-assign a command assigned to the first scale-out storage device among the assigned commands to second scale-out storage device among the scale-out storage devices based on the state information.

According to some embodiments, the controller is configured to change a time point to check a state of the first scale-out storage device based on the state information.

According to some embodiments, the state information includes information which indicates a garbage collection is performed in a non-volatile memory device included in the first scale-out storage device. According to some embodiments, the state information includes information which indicates an uncorrectable error is included in data output from the non-volatile memory device included in the first scale-out storage device.

The volatile memory device and the scale-out controller included in the first scale-out storage device are packaged in a multi-chip package.

When the data storage device further includes channels connected to the controller, each of the scale-out storage devices is connected to each of the channels.

The data storage device further includes a dynamic random access memory (DRAM) connected to the controller, the volatile memory device is a DRAM, the non-volatile memory device is a NAND-type flash memory device, and the data storage device is a solid-state drive.

Some exemplary embodiments of the present inventive concept are directed to a data processing system, including a host and a data storage device connected to the host. The data storage device includes scale-out storage devices and a controller configured to assign commands to the scale-out storage devices, and re-assign the commands assigned to the scale-out storage devices based on state information output from a first scale-out storage device among the scale-out storage devices. Each of the scale-out storage devices includes a volatile memory device, a non-volatile memory device, and a scale-out controller configured to control the volatile memory device and the non-volatile memory device.

The controller is configured to cancel a command assigned to the first scale-out storage device among the assigned commands based on the state information.

The state information may include information which indicates a garbage collection is performed in a non-volatile memory device included in the first scale-out storage device, or information which indicates an uncorrectable error is included in data output from a non-volatile memory device included in the first scale-out storage device.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
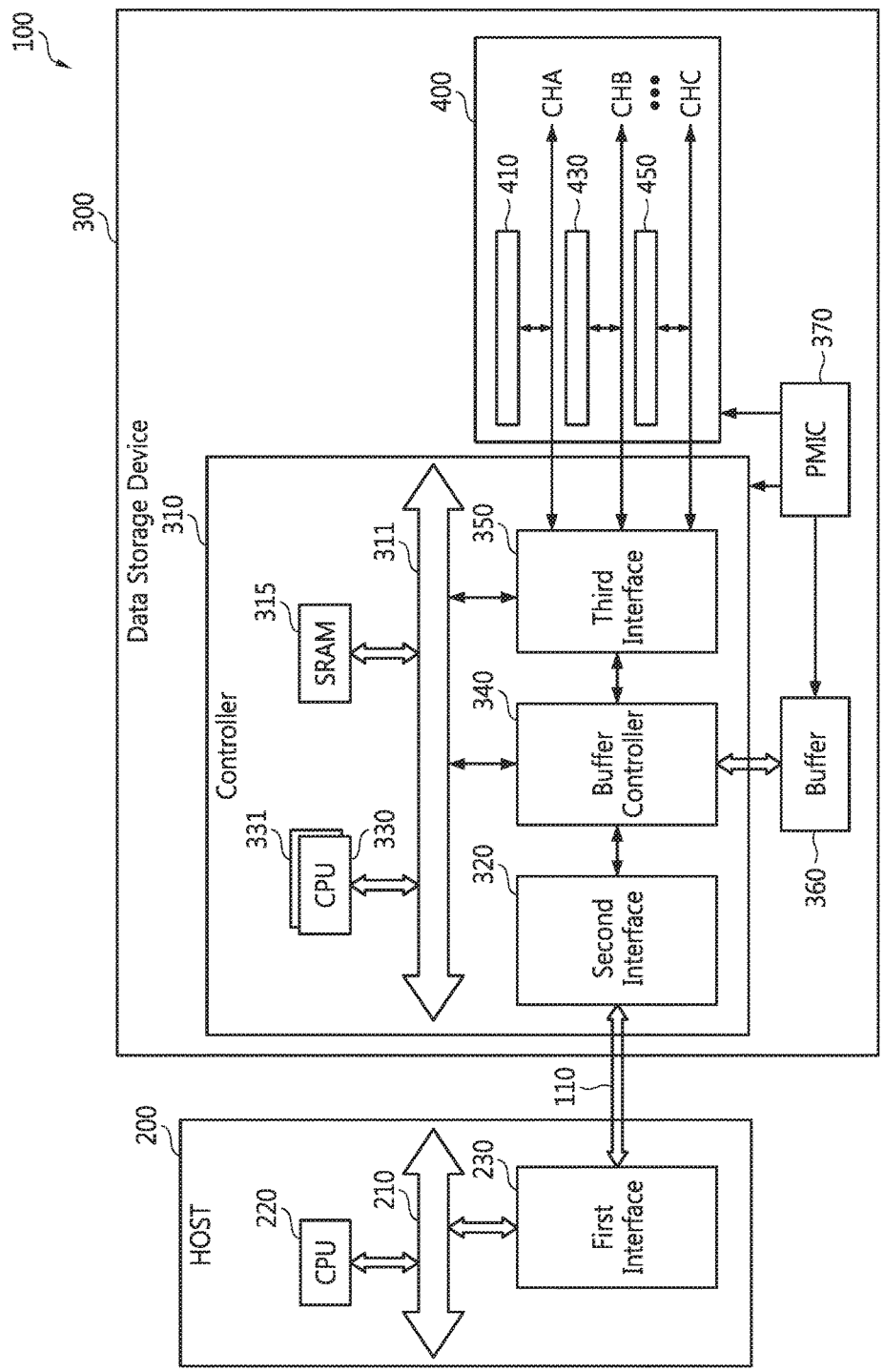
FIG. 1 is a block diagram which shows a data processing system according to an exemplary embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram which shows a data processing system 100 according to an exemplary embodiment of the present inventive concept. Referring to FIG. 1, a data processing system 100 may include a host 200 and a data storage device 300 which can transmit or receive a command and/or data to or from the host 200 through an interface 110.

Figure 2:
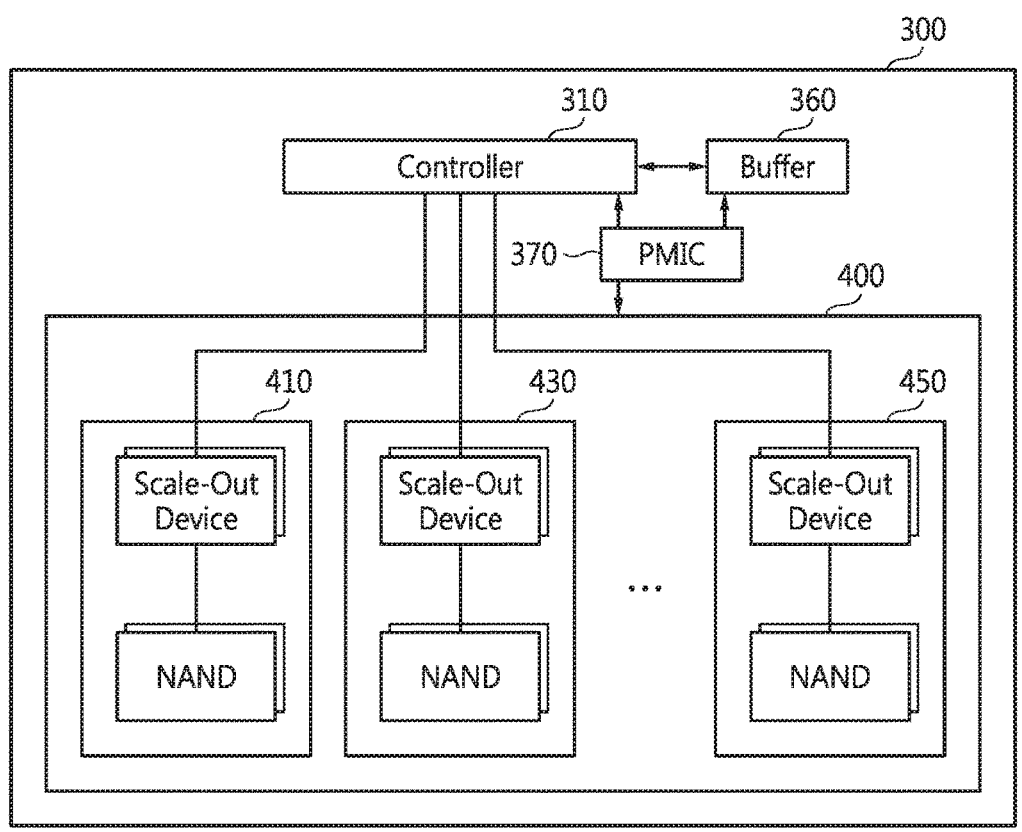
FIG. 2 is a block diagram of a data storage device shown in FIG. 1.

When a structure of the first cluster 400 included in the data storage device 300 has the structure shown in FIG. 2, the data storage device 300 may be embodied in a scale-out structure. For example, the data processing system 100 may be a memory system.

According to exemplary embodiments, the data processing system 100 may be embodied in a personal computer (PC), a workstation, a data center, an internet data center (IDC), a storage area network (SAN), a network attached storage (NAS), or a mobile computing device; however, it is not limited thereto.

A mobile computing device including the memory cluster 400 may be embodied in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book; however, it is not limited thereto.

The interface 110 may be embodied in a serial advanced technology attachment (SATA) interface, a SATA express (SATAe) interface, a serial attached small computer system interface (SCSI) interface, a peripheral component interconnect express (PCIe) interface, a non-volatile memory Express (NVMe) interface, an advanced host controller interface (AHCI) interface, or a multimedia card (MMC) interface; however, it is not limited thereto. According to exemplary embodiments, the interface 110 may transmit electrical signals or optical signals.

The host 200 may control a data processing operation (e.g., a write operation or a read operation) of the data storage device 300 through the interface 110. The host 200 may be a host controller.

The CPU 220 and the first interface 230 may transmit or receive a command and/or data to or from each other through bus architecture 210. The host 200 may include the bus architecture 210, the CPU 220, and the first interface 230 as shown in FIG. 1; however, a technical concept of the present inventive concept is not limited to the host 200 shown in FIG. 1.

According to an exemplary embodiment, the host 200 may be embodied in an integrated circuit (IC), a motherboard, a system on chip (SoC), an application processor (AP), a mobile AP, a web server, a data server, or a database server; however, it is not limited thereto. For example, the bus architecture 210 may be embodied in an advanced microcontroller bus architecture (AMBA), an advanced high-performance bus (AHB), an advanced peripheral bus (APB), an advanced eXtensible interface (AXI), an advanced system bus (ASB), an AXI Coherency Extensions (ACE), or a combination of these; however, it is not limited thereto.

The CPU 220 may generate a write request which can control a write operation of the data storage device 300 or a read request which can control a read operation of the data storage device 300. The write request may include a write address, and the read request may include a read address. For example, the CPU 220 may include one or more cores. The request may be a command.

The first interface 230 may change a format of a command and/or data to be transmitted to the data storage device 300, and transmit a command having a changed format and/or data having a changed format to the data storage device 300 through the interface 110. Moreover, the first interface 230 may change a format of a response and/or data transmitted to the data storage device 300, and transmit a response having a changed format and data having a changed format to the CPU 220 through the bus architecture 210. According to an exemplary embodiment, the first interface 230 may include a transceiver which can transmit or receive a command and/or data. A structure and an operation of the first interface 230 may be embodied to be compatible with a structure and an operation of the interface 110.

The data storage device 300 may include a controller 310, a buffer 360, a power management IC 370, and the memory cluster 400. Here, the memory cluster 400 may be a set of memory devices. Moreover, the memory cluster 400 may include scale-out devices and memory devices as shown in FIG. 2.

The data storage device 300 may be embodied in a flash memory-based memory device; however, it is not limited thereto. For example, the data storage device 300 may be embodied in a solid-state drive or solid-state disk (SSD), an embedded SSD (eSSD), a universal flash storage (UFS), a multimedia card (MMC), an embedded MMC (eMMC) or a managed NAND; however, it is not limited thereto. For example, the flash memory-based memory device may be embodied in a NAND-type flash memory device or a NOR-type flash memory device.

The flash memory-based memory device may include a memory cell array. The memory cell array may include a plurality of memory cells. For example, the memory cell array may include a two-dimensional memory cell array or a three-dimensional memory cell array.

The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an embodiment of the present inventive concept, the 3D memory array may include vertical NAND strings that are vertically oriented such that at least one memory cell is located over another memory cell. The at least one memory cell may comprise a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

According to exemplary embodiments, the data storage device 300 may be embodied in a hard disk drive (HDD), a phase change RAM (PRAM) device, a magnetoresistive RAM (MRAM) device, a spin-transfer torque MARAM (STT-MRAM) device, a ferroelectric RAM (FRAM) device, or a resistive RAM (RRAM) device; however, it is not limited thereto.

The controller 310 may control transmission or processing of a command and/or data transmitted or received among the host 200, the buffer 360, and the memory cluster 400. According to exemplary embodiments, the controller 310 may be embodied in an IC or a SoC.

The controller 310 may include bus architecture 311, an internal memory 315, a second interface 320, at least one of CPUs 330 and/or 331, a buffer controller 340, and a third interface 350.

The bus architecture 311 may be embodied in an AMBA, an AHB, an APB, an AXI, an ASB, an ACE, or a set of these; however, it is not limited thereto.

The internal memory 315 may store data which are necessary for an operation of the controller 310 or data which are generated by a data processing operation (for example, a write operation or a read operation) performed by the controller 310. For example, the internal memory 315 may store a first flash translation layer (FTL) to be performed by the CPUs 330 and/or 331. For example, when the data storage device 300 is booted, the first FTL may be loaded to the internal memory 315 from the memory cluster 400, and may be performed by the CPUs 330 and/or 331.

The internal memory 315 may be used as a queue buffer. For example, the queue buffer may receive and store commands transmitted from the host 200. Moreover, the queue buffer may store commands transmitted to the memory cluster 400 and information on the commands.

According to exemplary embodiments, the internal memory 315 may be embodied in a random access memory (RAM), a dynamic RAM (DRAM), a static RAM (SRAM), a buffer, a buffer memory, a cache, or a tightly coupled memory (TCM); however, a type of the internal memory 315 is not limited thereto.

The second interface 320 may change a format of a response and/or data to be transmitted to the host 200, and transmit the response having a changed format and/or the data having a changed format to the host 200 through the interface 110. Moreover, the second interface 320 may receive a command and/or data transmitted from the host 200, change a format of the command and/or data received, and transmit the command having a changed format and/or the data having a changed format to at least one of the CPUs 330 and/or 331 and/or the buffer controller 340. According to an exemplary embodiment, the second interface 320 may include a transceiver which can transmit or receive a signal and/or data.

A structure and an operation of the second interface 320 may be embodied to be compatible with the structure and the operation of the interface 110. For example the second interface 320 may be embodied in a SATA interface, a SATAe interface, a SAS interface, a PCIe interface, an NVMe interface, an AHCI interface, an MMC interface, a NAND-type flash memory interface, or a NOR-type flash memory interface; however, it is not limited thereto.

One or more CPUs 330 and/or 331 may control the internal memory 315, the second interface 320, the buffer controller 340, and the third interface 350 through the bus architecture 311. Each of the CPU 330 and 331 may include one or more cores. According to an exemplary embodiment, one or more CPUs 330 and/or 331 may control a PMIC 370.

For example, a first CPU 330 may transmit or receive data to or from the host 200 through the second interface 320. A second CPU 331 may transmit or receive data to or from the memory cluster 400 through the third interface 350. According to an exemplary embodiment, the first CPU 330 and the second CPU 331 may compose a multi-CPU. According to an exemplary embodiment, the first CPU 330 may control the second CPU 331; however, it is not limited thereto.

The buffer controller 340 may write data in the buffer 360 or read data from the buffer 360 according to a control of the first CPU 330 or the second CPU 331. The buffer controller 340 may be referred to as a controller or a buffer manager which can control a write operation and a read operation on the buffer 360.

The third interface 350 may control data processing operations (e.g., write operations or read operations) on the memory cluster 400 through a corresponding main channel among a plurality of main channels CHA, CHB, . . . , CHC according to a control of the first CPU 330 or the second CPU 331.

According to exemplary embodiments, the third interface 350 may be embodied in a SATA interface, a SATAe interface, a SAS interface, a PCIe interface, a NVMe interface, an AHCI interface, a MMC interface, a NAND-type flash memory interface, or a NOR-type flash memory interface; however, it is not limited thereto.

For example, the third interface 350 may include an error correction code (ECC) engine (not shown). The ECC engine may correct an error included in data to be stored in the memory cluster 400 and/or an error included in data output from the memory cluster 400. According to an exemplary embodiment, the ECC engine may be embodied anywhere inside the controller 310.

The buffer 360 may write data or read data according to a control of the buffer controller 340. According to exemplary embodiments, the buffer 360 which can be embodied in a volatile memory device may be embodied in a buffer memory, a RAM, a SRAM, or a DRAM; however, it is not limited thereto.

The buffer 360 may include a first region which stores a mapping table for a logical address to physical address conversion of a plurality of clusters 410, 430, . . . , 450, and a second region which can perform a function of a cache; however, it is not limited thereto. For example, the first FTL performed by the CPU 330 and/or 331 may perform the logical address to physical address conversion using the mapping table stored in the first region.

According to an exemplary embodiment, when each of the controller 310 and the buffer 360 is embodied in a different chip, the controller 310 and the buffer 360 may be embodied in one package, e.g., a package-on-package (PoP), a multi-chip package (MCP), or a system-in package (SiP); however, a type of the package is not limited thereto. For example, a first chip including the buffer 360 may be stacked above a second chip including the controller 310 through stack balls.

A PMIC 370 may control operation voltages supplied to the controller 310, the buffer 360, and/or the memory cluster 400. For example, a first operation voltage supplied to the controller 310, a second operation voltage supplied to the buffer 360, and a third operation voltage supplied to the memory cluster 400 may be the same as or different from each other.

The memory cluster 400 may include a plurality of clusters 410, 430, . . . , 450. A first cluster 410 may be connected to a first main channel CHA, a second cluster 430 may be connected to a second main channel CHB, and a third cluster 450 may be connected to a third main channel CHC.

A structure of each of the plurality of clusters 410, 430, . . . , 450 will be described in detail referring to FIGS. 2 to 7. Each of the plurality of clusters 410, 430, . . . , 450 may include a plurality of non-volatile memory devices, or packages including the plurality of non-volatile memory devices.

A main channel in the present specification may mean an independent data path which is present between the controller 310, i.e., the third interface 350, and a corresponding cluster. The data path may include transmission lines for transmitting data and/or control signals.

A way may mean a group of one or more non-volatile memory devices sharing one main channel. Accordingly, a plurality of ways may be connected to one main channel. The non-volatile memory device may mean a die, a memory device, or a semiconductor package. The controller 310 may control A-channel*B-way. At this time, each of A and B may mean a natural number of one or more.

Figure 3:
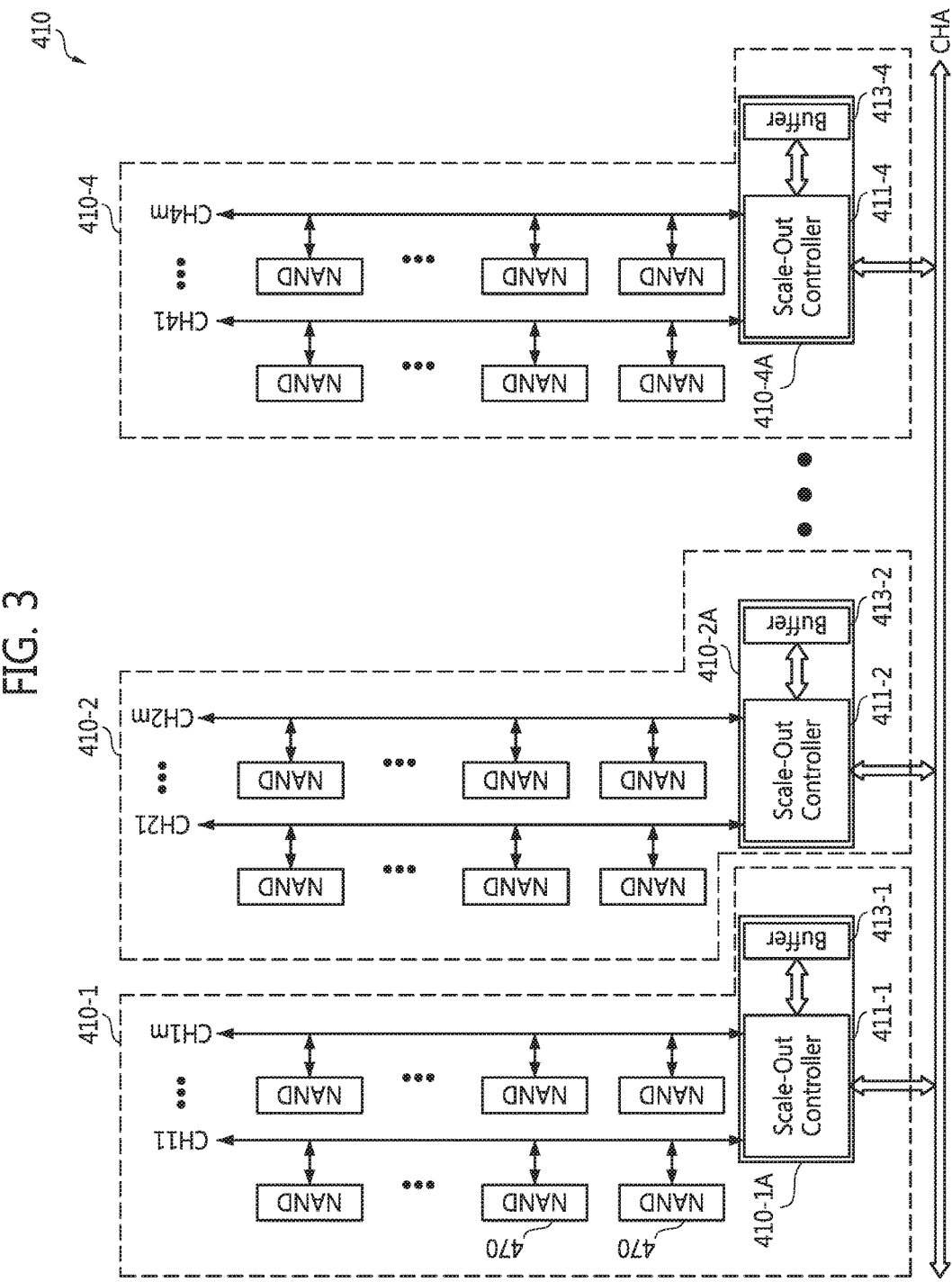
FIG. 3 is a block diagram which shows an exemplary embodiment of a first cluster shown in FIG. 2.

FIG. 2 is a block diagram of a data storage device 300 shown in FIG. 1, and FIG. 3 is a block diagram which shows an exemplary embodiment of a first cluster 410 shown in FIG. 2. The data storage device 300 may be embodied in a data storage device having a scale-out structure.

The first cluster 410 may include at least one scale-out device and at least one non-volatile memory, e.g., a NAND-type flash memory device NAND. Each of the other clusters 430 to 450 may include at least one scale-out device and at least one non-volatile memory device, e.g., the NAND-type flash memory device NAND.

Referring to FIGS. 1 to 3, since the clusters 410 to 450 are substantially the same as or similar to each other in structure and operation, a structure and an operation of the first cluster 410 are representatively described. The first cluster 410 may include a plurality of scale-out storage devices 410-1 to 410-4. Four scale-out storage devices 410-1 to 410-4 are shown in FIG. 3; however, a technical concept of the present inventive concept is not limited to the number of the plurality of scale-out storage devices 410-1 to 410-4 included in the first cluster 410. For example, each of the scale-out storage devices 410-1 to 410-4 may be a multi-chip set.

The first cluster 410 may include scale-out devices 410-1A, 410-2A, ..., 410-4A, and the NAND-type flash memory devices NAND connected to each of the scale-out devices 410-1A, 410-2A, ..., 410-4A. A first scale-out storage device 410-1 may include a first scale-out device 410-1A and non-volatile memory devices NAND connected to the first scale-out device 410-1A. A second scale-out storage device 410-2 may include a second scale-out device 410-2A and non-volatile memory devices NAND connected to the second scale-out device 410-2A. A fourth scale-out storage device 410-4 may include a fourth scale-out device 410-4A and non-volatile memory devices NAND connected to the fourth scale-out device 410-4A.

Each of the scale-out devices 410-1A, 410-2A, ..., 410-4A may include each of scale-out controllers 411-1, 411-2, ..., 411-4, and each of volatile memory devices 413-1, 413-2, ..., 413-4. The scale-out controllers 411-1, 411-2, ..., 411-4 are substantially the same as or similar to each other in structure.

A first scale-out controller 411-1 may be connected to a first main channel CHA, channels CH11 to CH1m, where m is a natural number of two or more, and a first volatile memory device 413-1. A corresponding non-volatile memory device NAND may be connected to each of the channels CH11 to CH1m. For example, each of the non-volatile memory devices NAND may be a NAND-type flash memory or a managed NAND flash memory device; however, it is not limited thereto. Here, each channel may mean an independent data path present between the first scale-out controller 411-1 and a corresponding non-volatile memory device NAND.

The first scale-out controller 411-1 may control an operation of each of the non-volatile memory devices NAND through each of the channels CH11 to CH1m. For example, the controller 310 may control an operation of the first scale-out controller 411-1 through the first main channel CHA.

The first volatile memory device 413-1 may include a first region for storing logical address to physical address mapping information (or mapping table) on the non-volatile memory devices NAND connected to each of the channels CH11 to CH1m. Moreover, the first volatile memory device 413-1 may further include a second region (or cache region) for storing data to be written in at least one of the non-volatile memory devices NAND connected to each of the channels CH11 to CH1m or data output from at least one of the non-volatile memory devices NAND connected to each of the channels CH11 to CH1m.

Figure 7:
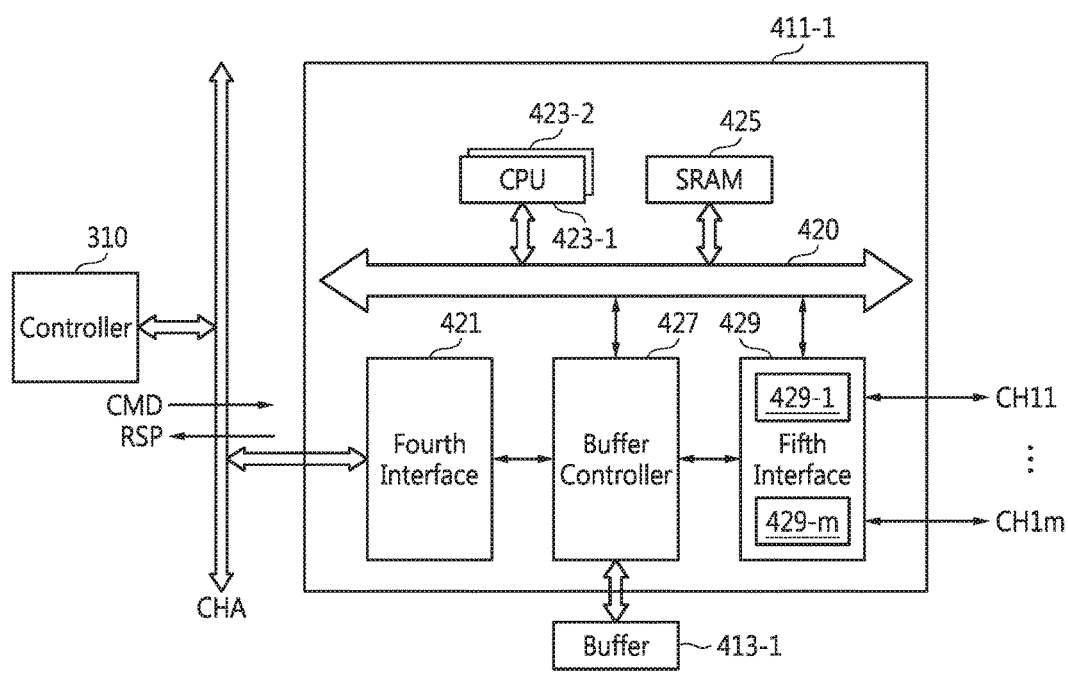
FIG. 7 is a block diagram of a first scale-out controller shown in FIG. 4.

For example, a second FTL performed by a CPU 423-1 or 423-2 included in the first scale-out controller 411-1 as shown in FIG. 7 may perform a logical address to physical address conversion using a mapping table stored in a first region of the first volatile memory device 413-1. The second FTL may be loaded to the internal memory 425 as shown in FIG. 7 from a non-volatile memory device included in the first cluster 410, and may be performed by the CPU 423-1 or 423-2.

The second scale-out controller 411-2 may be connected to the first main channel CHA, channels CH21 to CH2m, and a second volatile memory device 413-2. Corresponding non-volatile memory devices NAND may be connected to each of the channels CH21 to CH2m.

The second scale-out controller 411-2 may control an operation of each of the non-volatile memory devices NAND through each of the channels CH21 to CH2m. For example, the controller 310 may control an operation of the second scale-out controller 411-2 through the main channel CHA.

The second volatile memory device 413-2 may include a first region for storing logical address to physical address mapping information (or mapping table) on the non-volatile memory devices NAND connected to each of the channels CH21 to CH2m. Moreover, the second volatile memory device 413-2 may further include a second region (or cache region) which can temporarily store data to be written in at least one of the non-volatile memory devices NAND connected to each of the channels CH21 to CH2m or data output from at least one of the non-volatile memory devices NAND connected to each of the channels CH21 to CH2m.

As shown in FIG. 7, when the first scale-out controller 411-1 is the same as the second scale-out controller 411-2 in structure, a third FTL performed by the CPU 423-1 or 423-2 included in the second scale-out controller 411-2 may perform a logical address to physical address conversion using a mapping table stored in a first region of the second volatile memory device 413-2. The third FTL may be loaded to the internal memory 425 from a non-volatile memory device included in the first cluster 410 and may be performed by the CPU 423-1 or 423-2.

A fourth scale-out controller 411-4 may be connected to the first main channel CHA, channels CH41 to CH4m, and a fourth volatile memory device 413-4. Corresponding non-volatile memory devices NAND may be connected to each of the channels CH41 to CH4m.

The fourth scale-out controller 411-4 may control an operation of each of the non-volatile memory devices NAND through each of the channels CH41 to CH4m. For example, the controller 310 may control an operation of the fourth scale-out controller 411-4 through the main channel CHA.

The fourth volatile memory device 413-4 may include a first region for storing logical address to physical address mapping information (or mapping table) on the corresponding non-volatile memory devices NAND connected to each of the channels CH41 to CH4m. Moreover, the fourth volatile memory device 413-4 may further include a second region (or cache region) for temporarily storing data to be written in at least one of the corresponding non-volatile memory devices NAND connected to each of the channels CH41 to CH4m or data output from at least one of the corresponding non-volatile memory devices NAND connected to each of the channels CH41 to CH4m.

As shown in FIG. 7, when the first scale-out controller 411-1 is the same as the fourth scale-out controller 411-4 in structure, a fifth FTL performed by the CPU 423-1 or 423-2 included in the fourth scale-out controller 411-4 may perform a logical address to physical address conversion using a mapping table stored in a first region of the fourth volatile memory device 413-4. The fifth FTL may be loaded to the internal memory 425 from a non-volatile memory device included in the first cluster 410, and may be performed by the CPU 423-1 or 423-2.

Each of the volatile memory devices 413-1 to 413-4 may be a buffer or a buffer memory, and may be embodied in a RAM, an SRAM, or a DRAM; however, it is not limited thereto.

It is shown that each of the scale-out storage devices 410-1 to 410-4 includes the same number of channels in FIG. 3; however, the number of channels included in each of the scale-out storage device 410-1 to 410-4 may be different.

Figure 4:
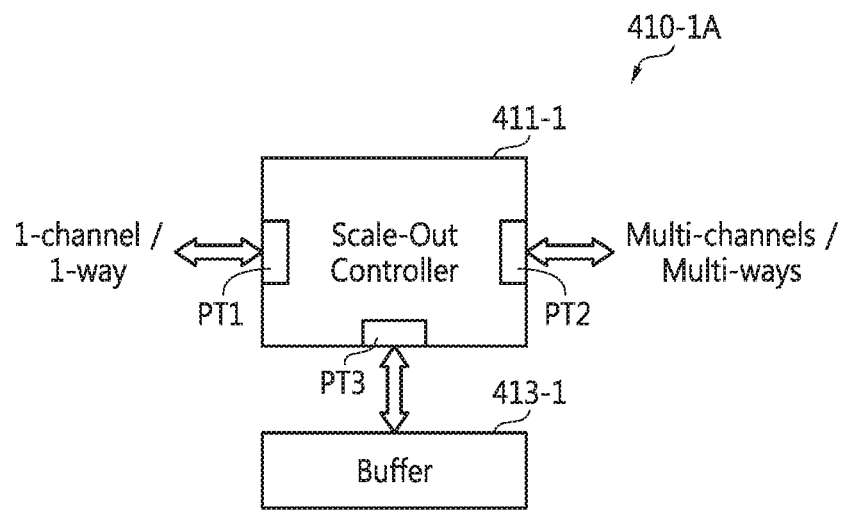
FIG. 4 is a schematic diagram of a first scale-out device shown in FIG. 3.

FIG. 4 is a schematic diagram of a first scale-out device shown in FIG. 3, and FIG. 7 is a block diagram of a first scale-out controller shown in FIG. 4.

Referring to FIGS. 1 to 5, and 7, the scale-out controllers 411-1 to 411-4 are substantially the same as or similar to each other in structure and operation, such that a structure and an operation of the first scale-out controller 411-1 will be representatively described.

The first scale-out controller 411-1 may control a transmission of a command and/or data transmitted or received among the controller 310, the first volatile memory device 413-1, and the non-volatile memory devices NAND included in the first scale-out storage device 410-1. According to exemplary embodiments, the first scale-out controller 411-1 may be embodied in an IC or an SoC.

The first scale-out controller 411-1 may include bus architecture 420, a fourth interface 421, at least one of the CPUs 423-1 and 423-2, the internal memory 425, a buffer controller 427, and a fifth interface 429. The bus architecture 420 may be embodied in AMBA, AHB, APB, AXI, ASB, ACE, or a combination of these; however, it is not limited thereto.

The fourth interface 421 may change a format of a response and/or data to be transmitted to the controller 310, transmit the response having a changed format and/or the data having a changed format to the controller 310 through the first main channel CHA. Moreover, the fourth interface 421 may receive a command and/or data transmitted from the controller 310, change a format of the command and/or the data received, and transmit the command having a changed format and/or the data having a changed format to at least one of the CPUs 423-1 and/or 423-2 and/or the buffer controller 427. According to an exemplary embodiment, the fourth interface 421 may include a transceiver which can transmit or receive a signal and/or data.

A structure and an operation of the fourth interface 421 may be embodied to be compatible with a structure and an operation of the third interface 350. For example, the fourth interface 421 may be embodied in a SATA interface, a SATAe interface, an SAS interface, a PCIe interface, an NVMe interface, an AHCI interface, an MMC interface, a NAND-type flash memory interface, or a NOR-type flash memory interface; however, it is not limited thereto.

According to an exemplary embodiment, referring to FIGS. 4 and 7, the fourth interface 421 may be connected to one channel (or one main channel) or one way. First terminals PT1 are terminals for connecting the first main channel CHA and the fourth interface 421, third terminals PT3 are terminals for connecting the first volatile memory device 413-1 and the buffer controller 427, and second terminals PT2 are terminals for connecting the fifth interface 429 and one or more channels CH11 to CH1m. The terminals may be pins or pads.

One or more CPUs 423-1 and/or 423-3 may control the fourth interface 421, the internal memory 425, the buffer controller 427, and the fifth interface 429 through the bus architecture 420. Each of the CPUs 423-1 to 423-3 may include one ore more cores.

For example, a first CPU 423-1 may transmit or receive data to or from the third interface 350 through the first main channel CHA and the fourth interface 421, and a second CPU 423-2 may transmit or receive data to or from at least one of the non-volatile memory devices NAND connected to each of the channels CH11 to CH1m through the fifth interface 429. According to an exemplary embodiment, the first CPU 423-1 and the second CPU 423-2 may define a multi-CPU. According to an exemplary embodiment, the first CPU 423-1 may control the second CPU 423-2.

The internal memory 425 may store data necessary for an operation of the first scale-out controller 415-1 or data generated by a data processing operation (for example, a write operation or a read operation) performed by the first scale-out controller 415-1. For example, the internal memory 425 may store a second flash translation layer (FTL) which can be performed by the CPU 423-1 and/or 423-2. For example, when the data storage device 300 is booted, the second FTL may be loaded to the internal memory 425 from a non-volatile memory included in the memory cluster 400. According to exemplary embodiments, the internal memory 425 may be embodied in a RAM, a DRAM, an SRAM, a buffer, a buffer memory, a cache, or a TCM; however, it is not limited thereto.

The buffer controller 427 may write data in the first volatile memory device 413-1 or read data from the first volatile memory device 413-1 according to a control of the first CPU 423-1 or the second CPU 423-2. The buffer controller 427 may be referred to as a controller or a buffer manager which can control a write operation and a read operation on the first volatile memory device 413-1.

The fifth interface 429 may control data processing operations on the non-volatile memory devices NAND through a corresponding channel among the plurality of channels CH11 to CH1m according to a control of the first CPU 423-1 or the second CPU 423-2.

Referring to FIGS. 4 and 7, a plurality of channels and/or a plurality of ways may be connected to the fifth interface 429. According to exemplary embodiments, the fifth interface 429 may be embodied in a SATA interface, a SATAe interface, an SAS interface, a PCIe interface, an NVMe interface, an AHCI interface, an MMC interface, a NAND-type flash memory interface, or a NOR-type flash memory interface; however, it is not limited thereto. For example, the fifth interface 429 may include each of memory controllers 429-1 to 429-m corresponding to each of the channels CH11 to CH1m. For example, when each of the non-volatile memory devices NAND is a NAND-type flash memory, each of the memory controllers 429-1 to 429-m may be a flash memory controller.

The first volatile memory device 413-1 may include a first region for storing a mapping table for a logical address to physical address conversion of the non-volatile memory devices NAND included in the first scale-out storage device 410-1, and a second region for performing a function of a cache; however, it is not limited thereto. For example, the second FTL performed by the CPUs 423-1 and/or 423-2 may perform the logical address to physical address conversion using the mapping table stored in the first region.

When at least one of the non-volatile memory devices NAND described referring to FIG. 3 is replaced with a first scale-out device 410-1A, scalability of capacity of the memory cluster 400 may increase.

Figure 5:
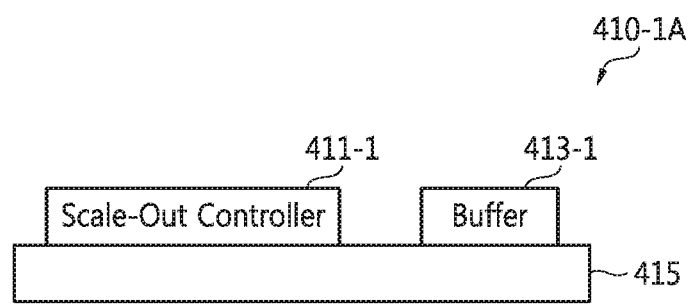
FIG. 5 is a diagram showing an exemplary embodiment of a semiconductor package of the first scale-out device shown in FIG. 4.

FIG. 5 is an exemplary embodiment of a semiconductor package of the first scale-out device shown in FIG. 4. Referring to FIGS. 3 to 5, the first scale-out device 410-1A may be embodied in a semiconductor package. That is, the first scale-out device 410-1A may include the first scale-out controller 411-1 and the first volatile memory device 413-1 each attached or mounted on a semiconductor substrate 415.

For example, the first scale-out controller 411-1 may be attached or mounted to the semiconductor substrate 415 in a flip-chip structure. Moreover, when the first scale-out controller 411-1 is attached or mounted to the semiconductor substrate 415 through an adhesive material, the first scale-out controller 411-1 may transmit or receive electrical signals to or from the semiconductor substrate 415 through bonding wires.

For example, the first volatile memory device 413-1 may be attached or mounted to the semiconductor substrate 415 in a flip-chip structure. Moreover, when the first volatile memory device 413-1 is attached or mounted to the semiconductor substrate 4145 through an adhesive material, the first volatile memory device 413-1 may transmit or receive electrical signals to or from the semiconductor substrate 415 through bonding wires. That is, the first scale-out controller 411-1 may transmit or receive a command and/or data to or from the first volatile memory device 413-1 through the semiconductor substrate 415. Semiconductor packages for each of scale-out devices 410-1A to 410-4A are substantially the same as or similar to each other.

Figure 6:
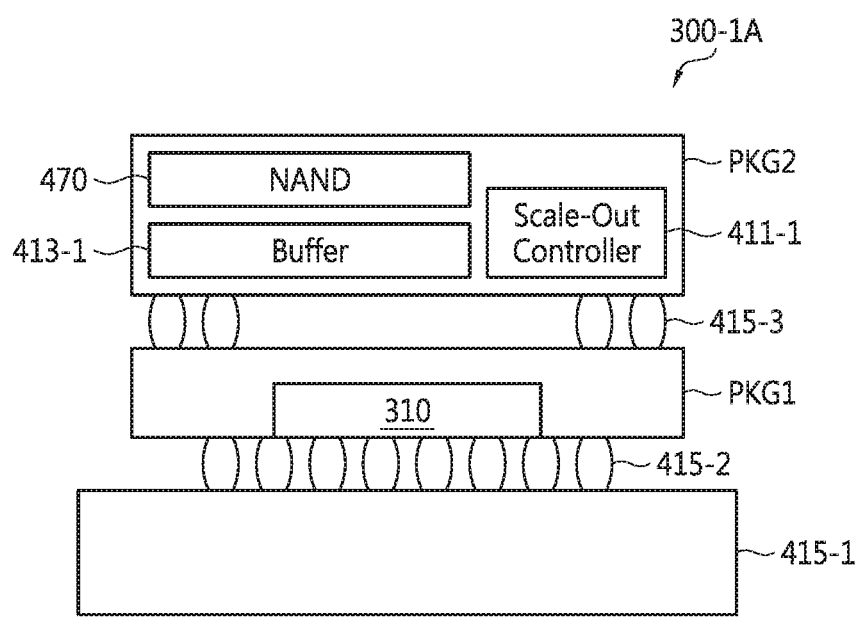
FIG. 6 is a diagram showing an exemplary embodiment of a semiconductor package including a controller and a first scale-out storage device shown in FIG. 1.

FIG. 6 is an exemplary embodiment of a semiconductor package including a controller and a first scale-out storage device shown in FIG. 1. A semiconductor package 300-1A shown in FIG. 6 may be embodied in an embedded package on package (ePOP); however, a type of the semiconductor package 300-1A is not limited thereto.

The semiconductor package 300-1A may include a semiconductor substrate 415-1, a first package PKG1 disposed over the semiconductor substrate 415-1, and a second package PKG2 disposed over the first package PKG. The first package PKG1 may be attached or mounted to the semiconductor substrate 415-1 through first bumps 415-2. The second package PKG2 may be attached or mounted to the first package PKG1 through second bumps 415-3. The first package PKG1 may include the controller 310. The second package PKG2 may include the first scale-out controller 411-1, the first volatile memory device 413-1, and at least one NAND-type flash memory 470. For example, the second package PKG2 may further include the buffer 360.

Referring back to FIGS. 2, 3, and 7, it is assumed that the data storage device 300 includes the controller 310 and the memory cluster 400, the number of devices included in the memory cluster 400 is N (N is a natural number of two or more), and each of the N devices is the same as the first device 410-1 shown in FIG. 3 in structure. Moreover, each of the N devices may include an independent FTL.

The controller 310 may improve performance of the data storage device 300 by evenly distributing a write command and/or a read command to each of the N devices. For example, in a case of a data write operation, the controller 310 issues or outputs write data to one of the N devices, and waits for a program completion response which indicates completion of a program on the write data from the device.

However, when a program failure occurs in the non-volatile memory device included in the device while the device performs a program operation on a non-volatile memory device included in the device, a FTL included in the device may perform a garbage collection operation. As the garbage collection operation is performed, the device may enter a long busy state until the garbage collection operation is completed.

In a case of a data read operation, as a process of manufacturing memory cells included in a non-volatile memory device becomes minute, an uncorrectable error may be increased in data output from the non-volatile memory device and the controller 310 uses various methods to correct the error. Accordingly, read latency of the controller 310 may increase.

Each of N scale-out storage devices (specially, scale-out controllers) according to an exemplary embodiment of the present inventive concept may report (or transmit) state information to the controller 310 when the long busy state is expected or when an uncorrectable error is included in read data. The controller 310 according to an exemplary embodiment of the present inventive concept may determine again a job assignment method for each of the N scale-out storage devices based on the state information output from at least one of the N scale-out storage devices (especially, scale-out controllers).

For example, a job may mean a write command and/or a read command; however, it is not limited thereto. A job assignment method may be referred to as a job allocation method, and the job assignment method may be referred to as a command allocation method.

For example, the job assignment (or command assignment) method may be as follows:
  1. A method of changing an order of jobs which can be inserted;
  2. A method of inserting (or transmitting) a corresponding job to another idle scale-out storage device;
  3. A method of re-ordering a corresponding job;
  4. A method of canceling a corresponding job;
  5. A method of re-assigning a corresponding job to another scale-out storage device;
  6. A method of changing a time point of checking state information on a scale-out storage device which is expected to be in a long busy state;
  7. A method of checking latest the state information on the scale-out storage device which is expected to be in a long busy state;
  8. A method of inserting a job latest into the scale-out storage device which is expected to be in a long busy state; and/or
  9. A method of removing an additional state check for the scale-out storage device which is expected to be in a long busy state.

The job assignment (or command assignment) method described above is an example, and a type of the job assignment (or command assignment) described above is not limited thereto. A job re-assignment may include the job assignment method described above.

The first scale-out controller 411-1 may control the non-volatile memory devices NAND in response to a command CMD output from the controller 310. The CPU 423-1 and/or 423-2 may receive a command CMD transmitted from the controller 310, and transmit state information RSP on the command CMD to the controller 310. The command CMD may include a program command, an erase command, and a read command; however, a type of the command CMD is not limited thereto. The command CMD may include at least one of the commands CMD1 to CMD4 shown in FIG. 8, and the state information RSP may include at least one of the state information RSP1 to RSP4 shown in FIG. 8.

The state information RSP may include information showing whether or not a command CMD output from the controller 310 is performed, information on time necessary for completion of the command CMD, information on whether or not an uncorrectable error is included in data, and/or information on whether or not in a long busy state; however, the state information RSP is not limited thereto. Here, long busy may mean a case of being delayed behind a command performance time scheduled (or expected) by the controller 100.

The CPU 423-1 and/or 423-2 may generate state information RSP based on operation state (e.g., whether or not a program operation or a read operation is properly performed and/or whether or not a garbage collection is performed) of the non-volatile memory device NAND transmitted through the fifth interface 429.

The first memory controller 429-1 may determine an operation state of at least one of the non-volatile memory devices NAND connected to a channel CH11, and transmit a result of the determination to the CPU 423-1 and/or 423-2. The CPU 423-1 and/or 423-2 may generate state information RSP based on the result of the determination.

For example, the first memory controller 429-1 may receive information which shows an operation completion time for a command CMD from the at least one of non-volatile memory devices NAND, determine an operation state of the at least one of non-volatile memory devices NAND, and transmit a result of the determination to the CPUs 423-1 and/or 423-2. The CPUs 423-1 and/or 423-2 may generate state information RSP based on the result of the determination.

The first memory controller 429-1 may determine whether or not an uncorrectable error is included in the data, determines an operation state of the at least one of non-volatile memory devices NAND according to a result of the determination, and transmit the result of the determination to the CPUs 423-1 and/or 423-2, when the command CMD is a read command of reading data from the at least one of non-volatile memory devices NAND. The CPUs 423-1 and/or 423-2 may generate state information RSP based on the result of the determination.

The first memory controller 429-1 may determine whether or not a program error occurs in the at least one of non-volatile memory devices NAND, determine an operation state of at least one of the non-volatile memory devices NAND based on a result of the determination, and transmit the result of the determination to the CPUs 423-1 and/or 423-2, when the command CMD is a program command which programs data in the at least one of the non-volatile memory devices NAND. The CPUs 423-1 and/or 423-2 may generate state information RSP based on the result of the determination.

Figure 8:
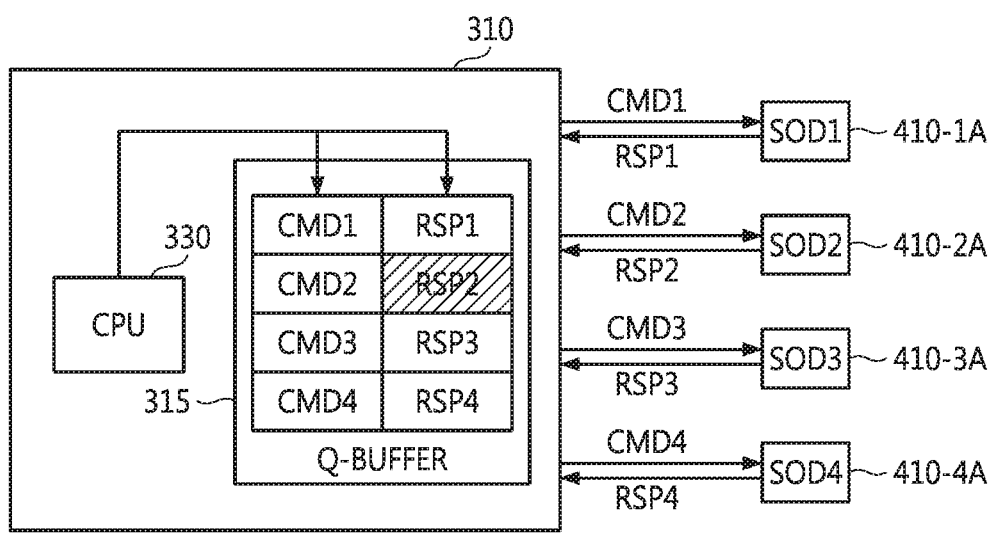
FIG. 8 is a block diagram which illustrates an operation of the controller and scale-out devices included in the first cluster shown in FIG. 2.

FIG. 8 is a block diagram which shows an operation of a controller and scale-out devices included in the first cluster shown in FIG. 2. Operations of the controller 310 and the scale-out devices 410-1A, 410-2A, 410-3A, and 410-4A included in the first cluster 410 are shown and described in FIGS. 8 to 11; however, a technical concept of the present inventive concept may be applied to an operation between the controller 310 and at least one scale-out device included in each of clusters 410 to 450.

Referring to FIGS. 1 to 8, the controller 310 may include a CPU 330 which generates the command CMD1 to CMD4 and the internal memory 315 which stores the commands CMD1 to CMD4. As described above, the internal memory 315 may be used as a queue buffer for storing the commands CMD1 to CMD4 and state information RSP1 to RSP4.

The CPU 330 may transmit each of the commands CMD1 to CMD4 stored in the queue buffer 120 to each of the scale-out devices 410-1A to 410-4A according to a schedule.

A first scale-out device 410-1A may transmit first state information RSP1 related to an operation of the first scale-out device 410-1A and/or first state information RSP1 which shows an operation state of at least one of the non-volatile memory devices connected to the first scale-out device 410-1A to the controller 310 based on the first command CMD1.

For example, the first state information RSP1 may be information which shows whether or not the first command CMD1 can be performed by the first scale-out device 410-1A, whether or not long busy is expected in the at least one of non-volatile memory devices, and/or whether or not an uncorrectable error occurs in at least one of the non-volatile memory devices; however, it is not limited thereto.

The controller 310 may perform the job re-assignment described above on the scale-out devices 410-1A to 410-4A based on the first state information RSP1. For example, the CPU 330 may transmit a command to be transmitted to the first scale-out device 410-1A to one of the scale-out devices 410-2A to 410-4A.

A second scale-out device 410-2A may transmit second state information RSP2 related to an operation of the second scale-out device 410-2A and/or second state information RSP2 which shows an operation state of at least one of the non-volatile memory devices connected to the second scale-out device 410-2A to the controller 310 based on a second command CMD2.

For example, the second state information RSP2 may be information which shows whether or not the second command CMD2 can be performed by the second scale-out device 410-2A, whether or not a long busy is expected in at least one of the non-volatile memory devices, and/or whether or not an uncorrectable error occurs in the at least one non-volatile memory device; however, it is not limited thereto.

The controller 310, e.g., the CPU 330, may perform the job re-assignment described above on the scale-out devices 410-1A to 410-4A based on the second state information RSP2. For example, the CPU 330 may transmit a command to be transmitted to the second scale-out device 410-2A to one of the scale-out devices 410-1A, 410-3A, and 410-4A.

A fourth scale-out device 410-4A may transmit fourth state information RSP4 which is related to an operation of the fourth scale-out device 410-4A and/or fourth state information RSP4 which shows an operation state of at least one of the non-volatile memory devices connected to the fourth scale-out device 410-4A to the controller 310 based on a fourth command CMD4.

For example, the fourth state information RSP4 may be information which shows whether or not the fourth command CMD4 can be performed by the fourth scale-out device 410-4A, whether or not a long busy is expected in at least one of the non-volatile memory devices, and/or whether or not an uncorrectable error occurs in the at least one of non-volatile memory device; however, it is not limited thereto.

The controller 310, e.g., the CPU 330, may perform the job assignment described above on the scale-out devices 410-1A to 410-4A based on the fourth state information RSP4. For example, the CPU 330 may transmit a command to be transmitted to the fourth scale-out device 410-4A to one of the scale-out devices 410-1A, 410-2A, and 410-3A based on the fourth state information RSP4.

Figure 9:
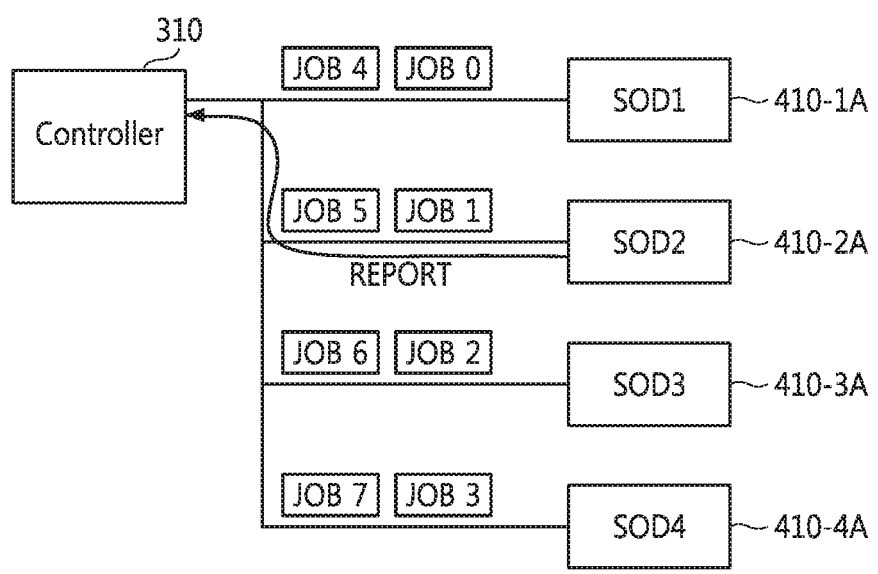
FIG. 9 is a block diagram which illustrates the operation of the controller and the scale-out devices included in the first cluster shown in FIG. 2.

FIG. 9 is a block diagram which shows the operation of the controller and the scale-out devices included in the first cluster shown in FIG. 2. Referring to FIGS. 1 to 9, the second scale-out device 410-2A may transmit information REPORT on jobs JOB1 and JOB5 to be performed based on the second command CMD2 output from the CPU 330 to the CPU 330 of the controller 310. The information REPORT may correspond to the second state information RSP2. For example, each of the jobs JOB1 and JOB5 may be a write operation performed according to write commands corresponding to the second command CMD2.

Figure 10:
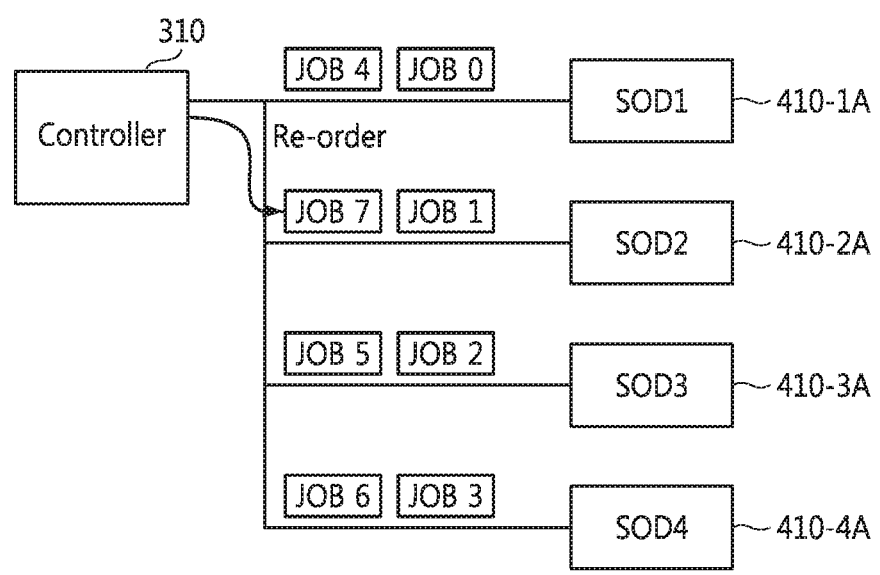
FIG. 10 is a block diagram which illustrates a process in which commands transmitted to the scale-out devices are reordered by the controller shown in FIG. 2.

FIG. 10 is a block diagram which shows a process in which commands transmitted to the scale-out devices are reordered by the controller shown in FIG. 2.

Referring to FIGS. 8 to 10, the controller 310, e.g., the CPU 330, may perform job re-assignment on scale-out devices 410-2A, 410-3A, and 410-4A based on the information REPORT output from the second scale-out device 410-2A.

For example, referring to FIGS. 9 and 10, the CPU 330 may re-order a sixth job JOB5 scheduled by the second scale-out device 410-2A as an eighth job JOB7, re-order a seventh job JOB6 scheduled by a third scale-out device 410-3A as the sixth job JOB5, and re-order an eighth job JOB7 scheduled by the fourth scale-out device 410-4A as the seventh job JOB6.

For example, the information REPORT output from the second scale-out device 410-2A includes information which shows a long busy is expected in the sixth job JOB5, the CPU 330 may re-order jobs JOB5, JOB6, and JOB7 for load re-balancing of the scale-out devices 410-1A to 410-4A. For example, "re-ordering" may include cancellation, re-assignment, and/or re-ordering; however, it is not limited thereto.

Figure 11:
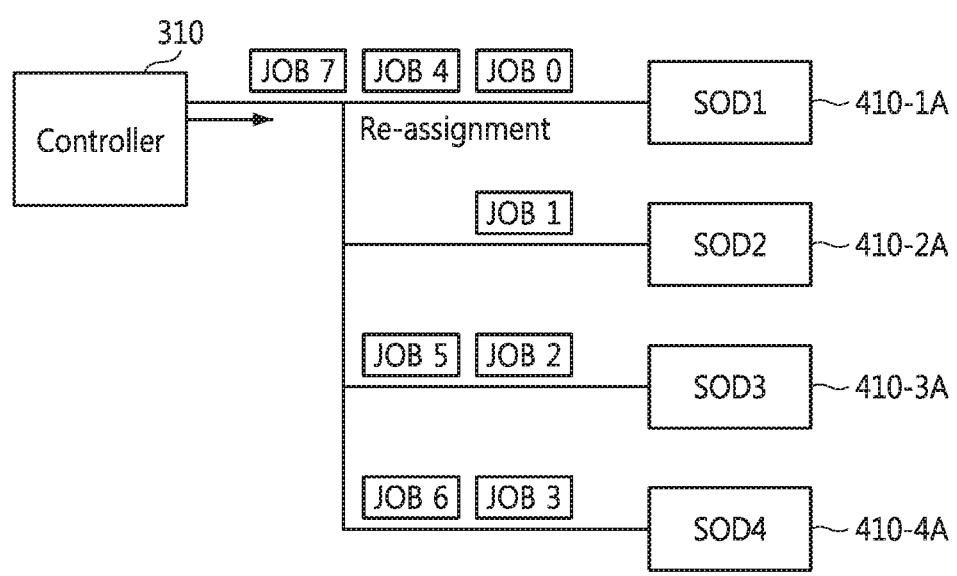
FIG. 11 is a block diagram which illustrates a process in which the commands transmitted to the scale-out devices are re-assigned by the controller shown in FIG. 2.

FIG. 11 is a block diagram which shows a process in which the commands transmitted to the scale-out devices are re-assigned by the controller shown in FIG. 2.

Referring to FIGS. 3 and 9, it is assumed that jobs JOB0 and JOB4 are assigned to the first scale-out storage device 410-1 which includes the first scale-out device 410-1A, jobs JOB1 and JOB5 are assigned to the second scale-out storage device 410-2 which includes the second scale-out device 410-2A, jobs JOB2 and JOB6 are assigned to the third scale-out storage device 410-3 which includes the third scale-out device 410-3A, and jobs JOB3 and JOB7 are assigned to the fourth scale-out storage device 410-4 which includes the fourth scale-out device 410-4A. Moreover, it is assumed that a corresponding job among jobs JOB0 to JOB4 is already processed by a corresponding scale-out device among the scale-out devices 410-1A to 410-4A.

Referring to FIGS. 9 and 11, the controller 310, e.g., the CPU 330, may perform job re-assignment on the scale-out devices 410-2A, 410-3A, and 410-4A based on information REPORT output from the second scale-out device 410-2A.

For example, when the information REPORT output from the second scale-out device 410-2A includes information which shows a long busy is expected in the sixth job JOB5, the CPU 330 may cancel the sixth job JOB5 assigned to the second scale-out device 410-2A, re-assign the sixth job JOB6 to the third scale-out device 410-3A, re-assign the seventh job JOB6 to the fourth scale-out device 410-4A, and re-assign the eighth job JOB7 to the first scale-out device 410-1A.

That is, the controller 310 may determine that a long busy is expected in the sixth job JOB5 assigned to the second scale-out device 410-2A, and re-assign the rest jobs JOB6 to JOB7 to the scale-out devices 410-1A, 410-3A, and 410-4A for load rebalancing of the scale-out devices 410-1A to 410-4A as shown in FIG. 11 according to a result of the determination.

Figure 12:
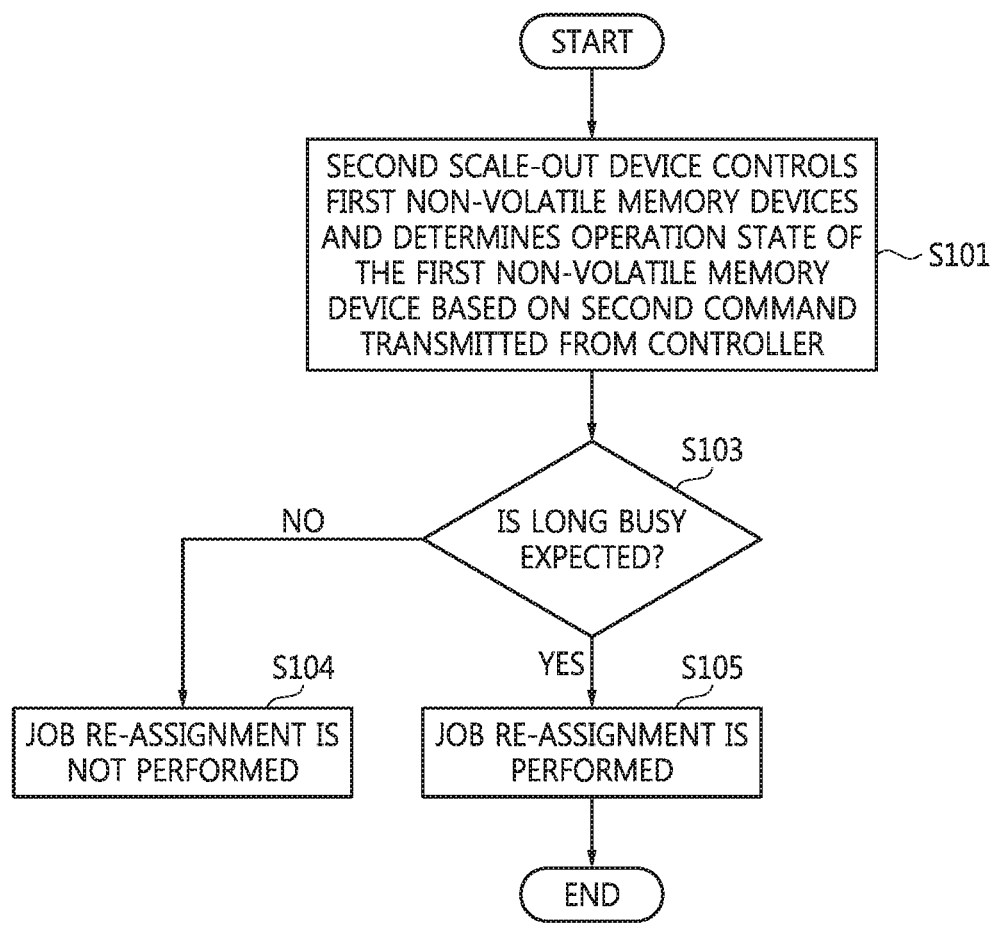
FIG. 12 is a flowchart illustrating a process in which the controller shown in FIG. 2 rebalances the commands transmitted to the scale-out devices.

FIG. 12 is a flowchart which shows a process in which the controller shown in FIG. 2 rebalances the commands transmitted to the scale-out devices. Here, "rebalancing" may mean job re-assignment.

Referring to FIGS. 1 to 12, the controller 310 may transmit a second command CMD2 to the second scale-out device 410-2. The second command CMD2 may mean a data read command, a data program command, and/or a command which can control an operation of at least one first non-volatile memory device among non-volatile memory devices NAND connected to the second scale-out device 410-2A.

The second scale-out device 410-2A may control the at least one first non-volatile memory device based on the second command CMD2 transmitted from the controller 310, and determine an operation state of the at least one first non-volatile memory device based on signals output from the at least one first non-volatile memory device (S101). For example, the operation state may mean a long busy state.

The second scale-out device 410-2A may transmit second state information RSP2=REPORT corresponding to the operation state to the controller 310. The controller 310 may determine whether or not long busy is expected in the at least one first non-volatile memory device based on the second state information RSP2=REPORT.

When a long busy is not expected (NO in S103), for example, when the second command CMD2 is a command related to the second job JOB1, the controller 310 does not perform job re-assignment. That is, the controller 310 may output at least one command originally scheduled to the second scale-out device 410-2A. Accordingly, the second scale-out device 410-2A may control an operation of at least one first non-volatile memory device among the non-volatile memory devices NAND connected to the second scale-out device 410-2A according to the at least one command originally scheduled.

When long busy is expected (YES in S103), for example, when the second command CMD2 is a command related to the sixth job JOB5, the controller 310 may perform job re-assignment described referring to FIGS. 10 and 11.

Figure 13:
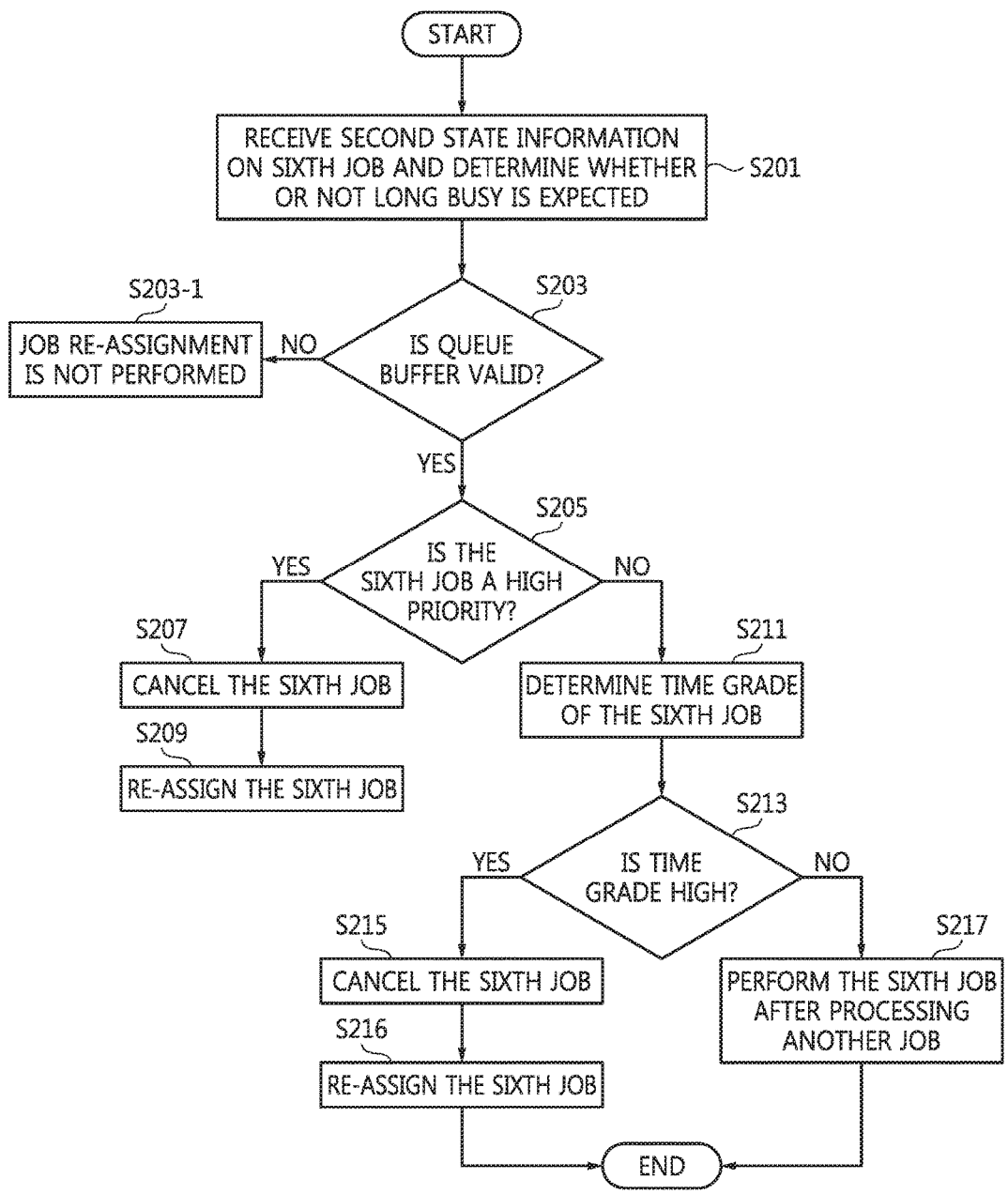
FIG. 13 is a flowchart illustrating a standard for rebalancing the commands transmitted to the scale-out devices by the controller shown in FIG. 2.

FIG. 13 is a flowchart which shows a typical approach where the controller shown in FIG. 2 rebalances the commands transmitted to the scale-out devices.

Referring to FIGS. 1 to 13, the controller 310 may receive second state information RSP2=REPORT on the sixth job JOB5 from the second scale-out device 410-2A. The second state information RSP2=REPORT may include information which shows that a long busy is expected in the sixth job JOB5 (S201). The controller 310 may perform job re-assignment on the scale-out devices 410-1A to 410-4A based on the second state information RSP2=REPORT.

The controller 310 may check the queue buffer 315 which stores the commands CMD1 to CMD4. For example, the controller 310 may check whether or not the queue buffer 315 is valid, whether or not commands are left in the queue buffer 315, and/or whether or not the queue buffer 315 can be used (S203).

When the queue buffer 315 is not valid, that is, when the queue buffer 315 cannot be used or commands to be transmitted to the queue buffer 315 are not present, the controller 310 may not perform the job re-assignment (S203-1).

When the queue buffer 315 is valid, that is, when the queue buffer 315 can be used, the controller 310 may perform job re-assignment on the scale-out devices 410-1A to 410-4A.

The controller 100 may check a priority of the sixth job JOB5 (S205). The priority can be determined by a user or a program.

When the sixth job is a high priority, as described referring to FIGS. 9 to 11, the controller 310 may cancel the sixth job JOB5 originally assigned to the second scale-out device 410-2A (S207), and re-assign the sixth job JOB5 to the third scale-out device 410-3A (S209).

When the sixth job JOB5 is not a high priority, the controller 310 may check a time grade of the sixth job JOB5 to be transmitted to the second scale-out controller 210 (S211). Here, the time grade may include information on estimated time to perform the sixth job JOB5.

For example, when a time grade of the sixth job JOB5 is low, the second scale-out device 410-2A may perform the sixth job JOB5 after all jobs JOB0 to JOB4, JOB6, and JOB7 are completed (S217). However, when the time grade of the sixth job JOB5 is high, the controller 310 may re-assign the sixth job JOB5. As shown in FIGS. 10 and 11, the controller 310 may cancel the sixth job JOB5 assigned to the second scale-out device 410-2A (S215), and re-assign the sixth job JOB5 to the third scale-out device 410-3A (S216).

Figure 14:
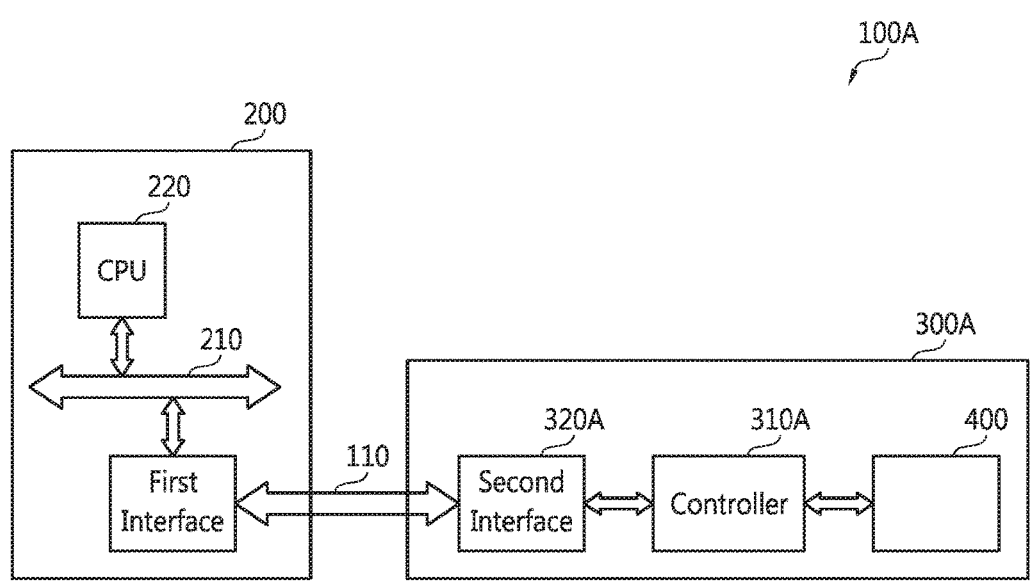
FIG. 14 is a block diagram which shows a data processing system according to another exemplary embodiment of the present inventive concept.

FIG. 14 is a block diagram which shows a data processing system according to another exemplary embodiment of the present inventive concept. Referring to FIGS. 1 to 14, a data processing system 100A may include a host 200 and a data storage device 300A. For example, the data storage device 300A may be embodied in an eMMC. The data storage device 300A may include a second interface 320A, a controller 310A, and the memory cluster 400.

The second interface 320A may control a command and/or data transmitted or received between the controller 310A and the host. For example, the second interface 320A may be connected to the host 200 through an MMC interface 110. A function of the second interface 320A may be the same as or similar to a function of the second interface 320 of FIG. 1.

The controller 310A may control an operation of the data storage device 300A. A structure and an operation of the controller 310A may be substantially the same as or similar to a structure and an operation of the controller 310 of FIG. 1.

The controller 310A may control an operation of the memory cluster 400. The memory cluster 400 may include one or more clusters, and a structure of each cluster may be substantially the same as or similar to a structure of each cluster shown in FIGS. 2 and 3.

Figure 15:
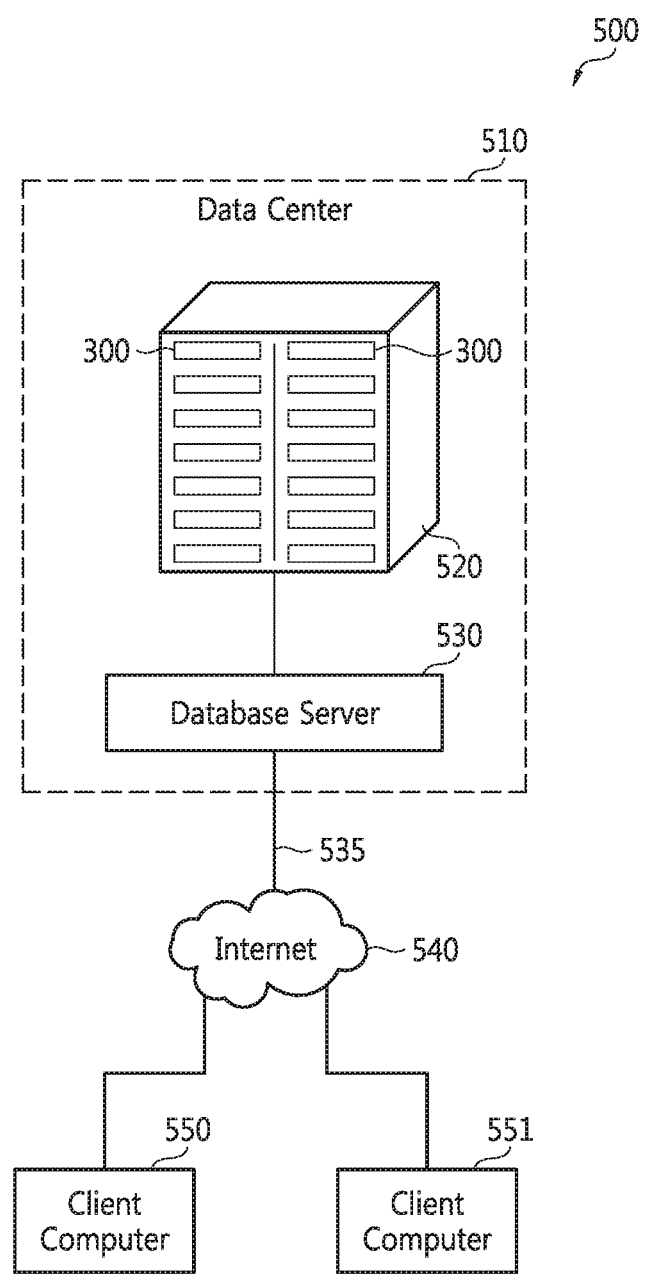
FIG. 15 is a block diagram which shows a data processing system according to still another exemplary embodiment of the present inventive concept.

FIG. 15 is a block diagram which shows a data processing system according to still another exemplary embodiment of the present inventive concept. Referring to FIGS. 1 to 15, a data processing system 500 may include a database 520, a database server 530, a second network 540, and a plurality of client computers 550 and 551. A data center, an internet data center, or a cloud data center 510 may include the database 520 and the database server 530.

The database 520 may include a plurality of data storage devices 300 or 300A. The plurality of data storage devices 300 may be installed in a rack. A structure and an operation of each data storage device 300 may be substantially the same as or similar to a structure and an operation of the data storage device 300 described referring to FIGS. 1 to 13.

The database server 530 may control an operation of each of the plurality of data storage devices 300. For example, the database server 530 may perform a function of the host 200 shown in FIG. 1.

The database server 530 may be connected to a second network 540, e.g., the internet or Wi-Fi, through a first network 535, e.g., a local area network (LAN). Each of a plurality of client computers 550 and 551 may be connected to the database server 530 through the second network 540.

In a data storage device including the scale-out storage devices according to an exemplary embodiment of the present inventive concept, each of the scale-out storage devices (particularly, scale-out controllers) may report (or transmit) state information to a controller when a long busy is expected or when an uncorrectable error is included in read data.

A controller according to an exemplary embodiment of the present inventive concept may decide again a job assignment method or a command assignment method of assigning a job or a command to scale-out storage devices based on state information output from at least one of the scale-out storage devices.

Accordingly, the data storage device may decide again the job assignment method or the command assignment method of assigning a job or a command to scale-out storage devices even when a long busy is expected or an uncorrectable error is included in read data, thereby improving a data processing performance.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data storage device comprising:
scale-out storage devices; and
a controller configured to assign commands to the scale-out storage devices, transmit the commands to the scale-out storage devices, and re-assign a command initially assigned to a first scale-out storage device among the scale-out storage devices based on state information output from the first scale-out storage device, the state information is based on an operation state of the first scale-out storage device responsive to the command initially assigned to the first scale-out storage device,
wherein each of the scale-out storage devices comprises
a volatile memory device,
a non-volatile memory device, and
a scale-out controller configured to control the volatile memory device and the non-volatile memory device, and transmit the state information to the controller.

2. The data storage device of claim 1, wherein the volatile memory device comprises a mapping table for a logical address to physical address conversion of the non-volatile memory device, and
the scale-out controller comprises a central processing unit (CPU) configured to perform a flash translation layer (FTL) for performing the logical address to physical address conversion using the mapping table.

3. The data storage device of claim 1, wherein the controller is configured to change an order of the commands assigned to the scale-out storage devices based on the state information.

4. The data storage device of claim 1, wherein the controller is configured to re-assign the command initially assigned to the first scale-out storage device from among the assigned commands to a second scale-out storage device from among the scale-out storage devices based on the state information.

5. The data storage device of claim 1, wherein the controller is configured to change a time point of checking a state of the first scale-out storage device based on the state information.

6. The data storage device of claim 1, wherein the state information comprises information which indicates that a garbage collection is being performed in the non-volatile memory device included in the first scale-out storage device.

7. The data storage device of claim 1, wherein the state information comprises information which indicates an uncorrectable error is included in data output from the non-volatile memory device included in the first scale-out storage device.

8. The data storage device of claim 1, wherein the volatile memory device and the scale-out controller included in the first scale-out storage device are packaged into a multi-chip package.

9. The data storage device of claim 1, further comprising channels connected to the controller, wherein the scale-out storage devices are respectively connected to the channels.

10. The data storage device of claim 1, wherein the volatile memory device is a dynamic random access memory (DRAM), the non-volatile memory device is a NAND-type flash memory device, and the data storage device is a solid-state drive (SSD),
the data storage device further comprises another dynamic random access memory connected to the controller.

11. A data processing system comprising:
a host; and
a data storage device, connected to the host, and including scale-out storage devices and a controller,
the controller configured to assign commands to the scale-out storage devices, receive state information transmitted from the scale-out storage devices, store the commands and the state information in an internal memory, and re-assign a command initially assigned to a first scale-out storage device among the scale-out storage devices based on first state information from among the state information output from the first scale-out storage device, the first state information is based on an operation state of the first scale-out storage device responsive to the command initially assigned to the first scale-out storage device,
wherein each of the scale-out storage devices includes a volatile memory device, a non-volatile memory device, and a scale-out controller configured to control the volatile memory device and the non-volatile memory device and transmit the state information to the controller.

12. The data processing system of claim 11, wherein the volatile memory device comprises a mapping table for a logical address to physical address conversion on the non-volatile memory device, and
the scale-out controller comprises a central processing unit (CPU) configured to perform a flash translation layer (FTL) for performing the logical address to physical address conversion using the mapping table.

13. The data processing system of claim 11, wherein the controller is configured to change an order of the commands assigned to the scale-out storage devices based on the first state information.

14. The data processing system of claim 11, wherein the controller is configured to cancel the command initially assigned to the first scale-out storage device from among the assigned commands based on the first state information.

15. The data processing system of claim 11, wherein the controller is configured to change a time point of checking a state of the first scale-out storage device based on the first state information.

16. The data processing system of claim 11, wherein the first state information comprises information which indicates that a garbage collection is performed in the non-volatile memory device included in the first scale-out storage device.

17. The data processing system of claim 11, wherein the first state information comprises information which indicates that an uncorrectable error is included in data output from the non-volatile memory device included in the first scale-out storage device.

18. The data processing system of claim 11, wherein the volatile memory device and the scale-out controller included in the first scale-out storage device are packaged into a multi-chip package.

19. The data processing system of claim 11, further comprising channels connected to the controller, wherein the scale-out storage devices are respectively connected to the channels.

20. The data processing system of claim 11, wherein the volatile memory device is a dynamic random access memory (DRAM), the non-volatile memory device is a NAND-type flash memory device, and the data storage device is a solid-state drive (SSD), and
the data storage device further comprises another dynamic random access memory connected to the controller.

* * * * *